United States Patent [19]
Gilpatrick

[11] Patent Number: 5,134,785
[45] Date of Patent: Aug. 4, 1992

[54] METHOD AND APPARATUS TO MEASURE PILE LOOP HEIGHT

[75] Inventor: Michael W. Gilpatrick, Chesnee, S.C.

[73] Assignee: Milliken Research Corporation, Spartanburg, S.C.

[21] Appl. No.: 769,246

[22] Filed: Oct. 1, 1991

[51] Int. Cl.$^5$ ............................ G01B 3/22; G01B 5/14
[52] U.S. Cl. ........................................ 33/832; 33/834; 33/527
[58] Field of Search ................. 33/832, 833, 834, 1 R, 33/526, 527, 700, 701

[56] References Cited

U.S. PATENT DOCUMENTS

| | | | |
|---|---|---|---|
| 1,927,821 | 9/1933 | Abbott, Jr. | 33/834 |
| 3,093,908 | 6/1963 | Rabinow | 33/834 |
| 3,168,784 | 2/1965 | Morrissey | 33/834 |
| 3,340,615 | 9/1967 | Tooke Jr. | 33/834 |
| 3,349,495 | 10/1967 | Zemberry | 33/701 |
| 3,758,957 | 9/1973 | Eskijian | 33/834 |
| 3,881,256 | 5/1975 | Jewell et al. | 33/834 |
| 4,212,698 | 7/1980 | Blair . | |
| 4,235,018 | 11/1980 | Sabery | 33/834 |
| 4,342,132 | 8/1982 | Fromknecht . | |
| 4,450,628 | 5/1984 | Rocks | 33/833 |

FOREIGN PATENT DOCUMENTS

| | | | |
|---|---|---|---|
| 0195104 | 11/1984 | Japan | 33/834 |
| 312174 | 1/1972 | U.S.S.R. . | |
| 477321 | 11/1975 | U.S.S.R. . | |
| 599214 | 3/1978 | U.S.S.R. . | |
| 640112 | 1/1979 | U.S.S.R. . | |

Primary Examiner—Thomas B. Will
Attorney, Agent, or Firm—H. William Petry; Earle R. Marden

[57] ABSTRACT

A method and apparatus to measure the loop height in a loop pile fabric by moving an apparatus across the surface of the fabric and allowing the loops to create a line on a powdered surface to which a finger is aligned with to cause the plunger of a gauge to automatically provide a read-out of the loop pile height.

9 Claims, 3 Drawing Sheets

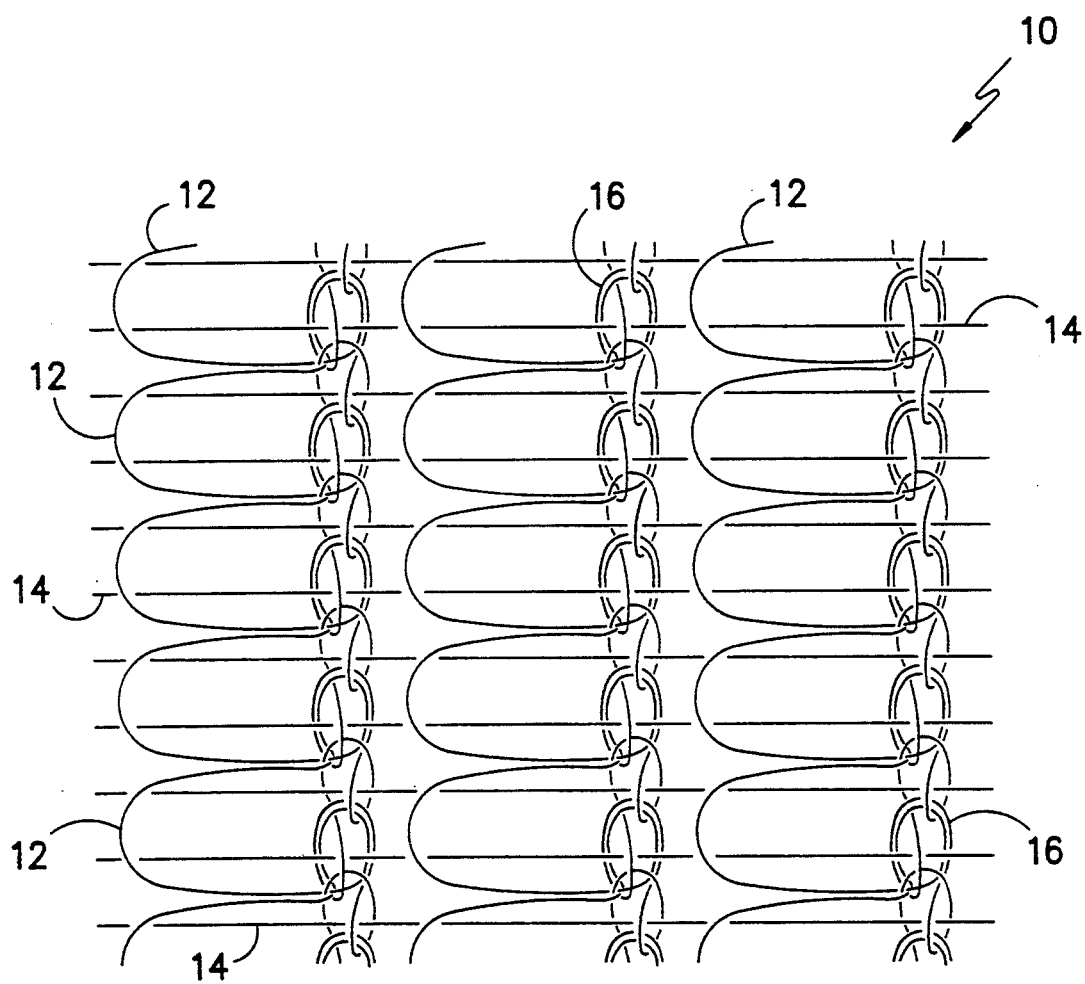
FIG. -1-

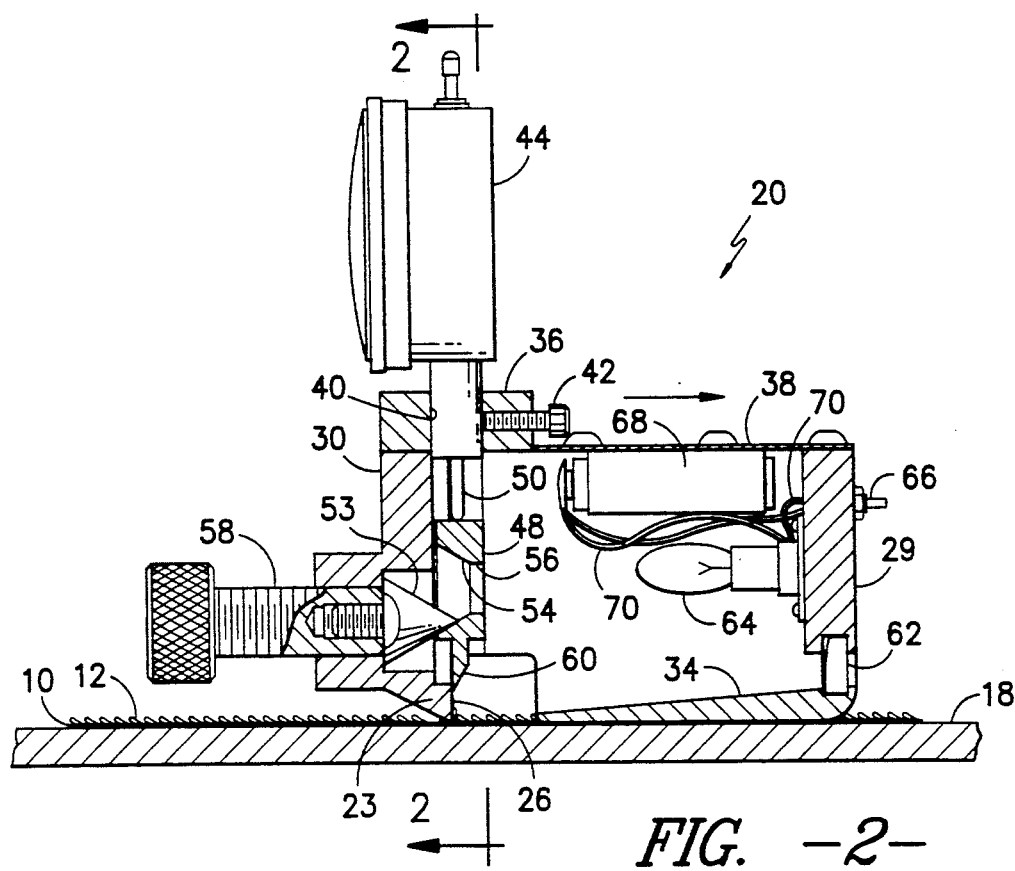
FIG. -2-
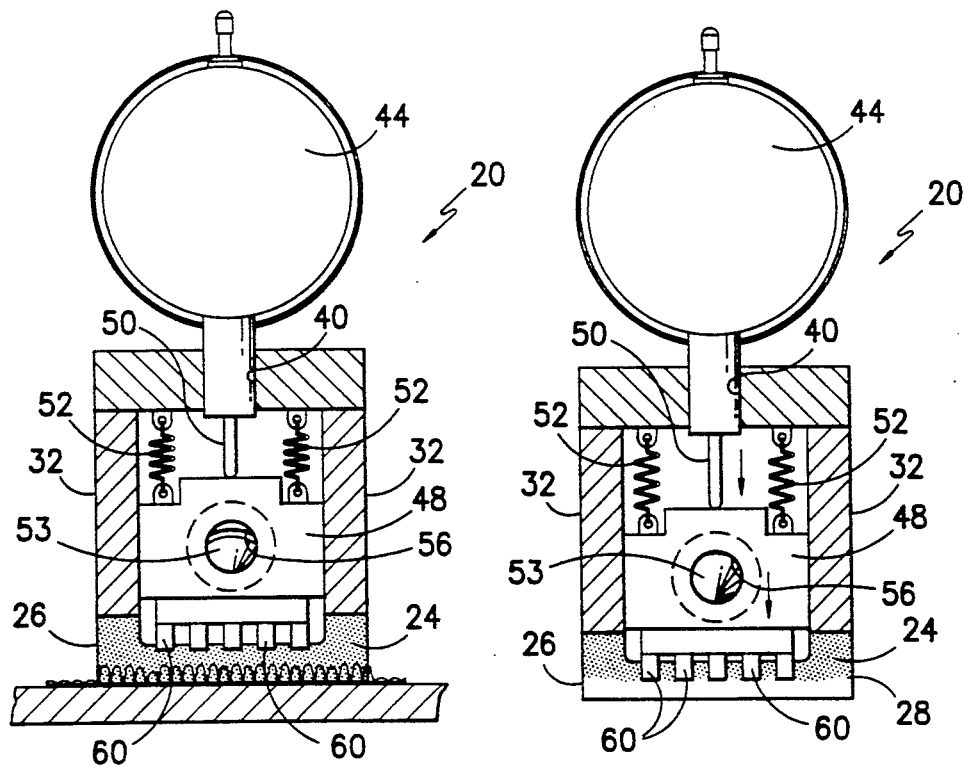
FIG. -3-   FIG. -4-

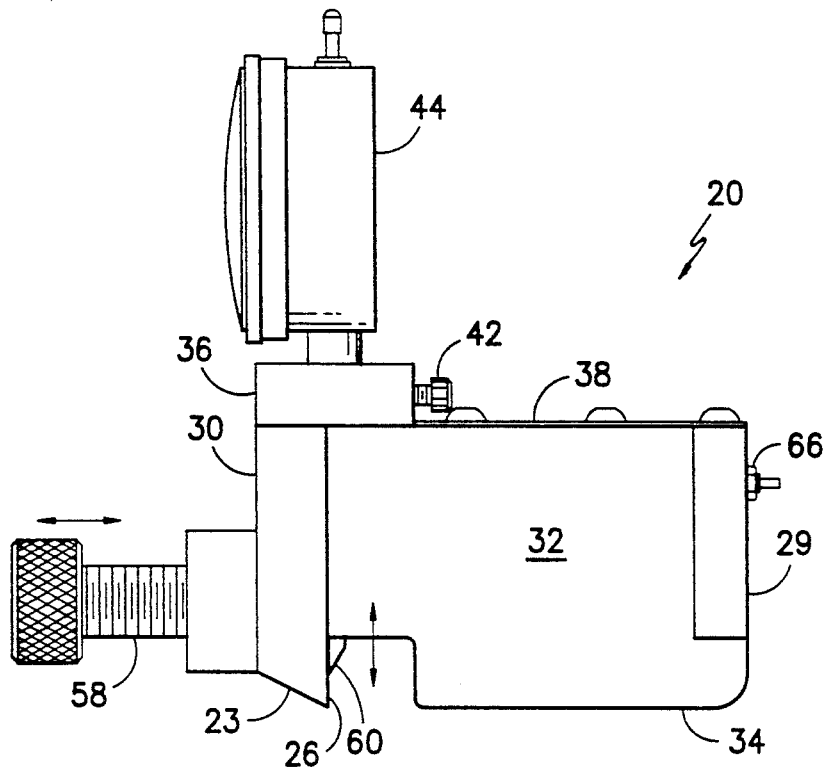
FIG. —5—
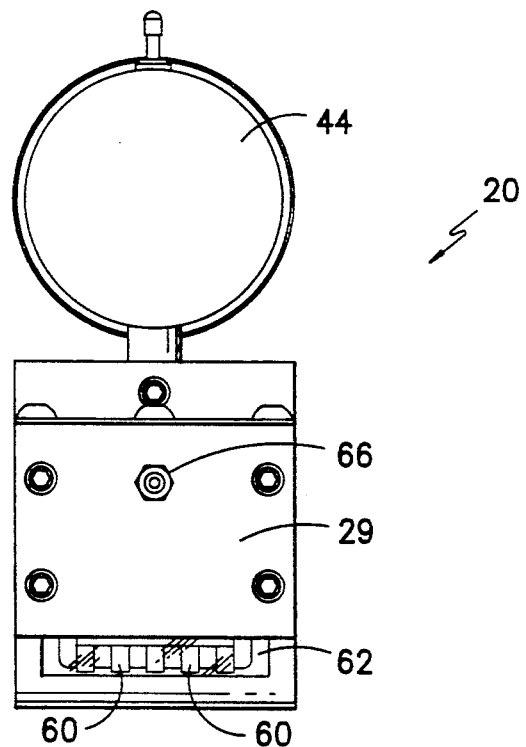
FIG. —6—

METHOD AND APPARATUS TO MEASURE PILE LOOP HEIGHT

This invention relates generally to loop pile fabrics and more specifically to a method and apparatus to raise the loops from the surface of a loop pile fabric and measure the height thereof.

Loop pile fabrics are employed as the loop element in a hook and loop detachable arrangement where the loop is mounted on one object to be removably engaged by the hooks on another object such as in a typical Velcro arrangement. One use of the loop fabric would be on the back of an abrasive fabric to be engaged by the hooks on the face of a rotary abrading machine. When the abrasive fabric has been used up it can be pulled away from the abrading machine to disengage the loops from the hooks. For proper operation the loopss have to be long enough to provide a tight seal with the hooks but not so long as to prevent disengagement of the abrasive fabric from the abrasive machine. To this end the herein-disclosed method and device provide a means to measure the loop height in order to provide a loop pile fabric with a pre-determined loop height.

Therefore, it is an object of the invention to provide a method and apparatus to raise and measure the height of the loops on a loop pile fabric.

Other objects and advantages of the invention will become readily apparent as the specification proceeds to describe the invention with reference to the accompanying drawings, in which:

FIG. 1 is a typical loop pile fabric used as one-half of a hook and loop arrangement;

FIG. 2 is a partial section view of the loop height measuring apparatus in use on the fabric of FIG. 1.

FIG. 3 is a cut-away vertical section view looking toward the left in FIG. 2;

FIG. 4 is a view similar to FIG. 3 with the apparatus adjusted to show the loop height;

FIG. 5 is a side view of the loop measuring apparatus, and

FIG. 6 is a right hand end view of the apparatus of FIG. 5.

A typical fabric 10 to which the disclosed method and apparatus is shown in FIG. 1 which has loops 12 which lie generally flat with the surface of the fabric. The fabric 10 (see U.S. Pat. No. 4,624,116) is a warp knit, weft inserted lap side loop pile fabric which can be used as the female connection to a male type hook connector (not shown) to form a Velcro-type connecting means. The fabric 10 consists basically of lap loops 12, weft inserted yarns 14 held together with chainstitch yarns 16.

As shown in FIG. 2 the fabric 10 of which the height of the loop 12 is to be measured is laid on a flat surface 18 and the measuring apparatus 20 is moved thereover to raise the loops 12 of the fabric 10 and measure the height of the raised loop or loops 12. This is accomplished by the triangular sharp edge portion 23 raising the loops 12 as the apparatus 20 is moved against the lay position of the loops 12 and the loops rub off the talc 24 placed on the face 26 of the triangular portion 23 to leave a line 28 thereon as shown in FIG. 4.

FIGS. 2–6 show the measuring apparatus 20 in detail. The apparatus has a front plate 29, a back plate 30, side plates 32, a base plate 34, a top plate 36 and a cover plate 38. Mounted through an aperature 40 in the top plate 36 and held there by a suitable set screw 42 is a gauge 44 calibrated to show height measurements in suitable terms such as inches or centimeters. The slide block 48 slides between the side plates 32 by the action of the cone member 53 on the tapered or inclined surface 54 of the opening 56 in the slide block. The cone member 52 is moved in and out by the screw 58 to position the downwardly extending fingers 60 of the slide block 48.

The relative vertical locations of cone member 53 and tapered or inclined surface 54 of the opening 56 in the slide block are chosen so that when cone member 53 is fully seated in the tapered or inclined surface 54 of the opening 56 of slide block 48, the tips of the fingers 60 are aligned with the bottom of the triangular portion 23. The zero position indication on gauge indicator (not shown) is established through the action of slide block 48 engaging the plunger-actuator 50 of the gauge 44 when the tips of fingers 60 are thus aligned with the bottom of the triangular portion 23.

The front plate 30 has a magnifying lens 62 mounted between the bottom thereof and the base plate 34 so that when the light 64 is turned on by actuation of the switch 66 an observer can look through the lens to adjust the position of the fingers 60 relative to the line 28 on the face 26 of the triangular portion 23. Energy is supplied to the light 64 by the batteries 68 mounted in the underside of the cover plate 38 and connected to the switch 66 and light 64 by suitable wires 70.

OPERATION

When it is desired to measure the loop height of a yarn in a loop pile fabric 10 the fabric 10 is placed on the flat surface 18 with the loops 12 facing upward. Then the fingers 60 of the measuring apparatus 20 are moved upward by the rotation of the screw 58 to move the cone 53 outward to allow the springs 52 to slide the block 48 upward. Then the face 26 of the triangular portion 23 is cleaned and then dusted with a thin layer of fine grain powder 24, such as talcum powder or chalk. Then the apparatus is placed on the fabric 10 and moved in the direction indicated by the arrow in FIG. 2 opposite to the lay of the loops 12 so that the loops are raised and will brush the powder 24 from the face 26 of the triangular portion 23 to leave a line 28. Then the measuring instrument is removed from the fabric 10 and the light 64 turned on by actuation of the switch 66. The operator, looking through the lens 62 towards the line 28, rotates the hand screw 58 to move the cone 53 inward to slide the block downward until the tips of the fingers 60 coincide with the line 28 (FIG. 4). Once the block 48 is set in correct position the height of the loops 12 can be read on the gauge 44, thus providing a concise measurement of the average pile height. For accurate readings the face 26 of the triangular portion 23 should be coated with a paint or other substance which sharply contrasts with the powder placed thereon.

It can be seen that an apparatus and method have been described which provide an easy method to accurately measure the height of a loop in a pile fabric.

The herein-described method and apparatus is the preferred embodiment of the invention and it is contemplated that changes may be made within the scope of the invention and it is therefore requested that the scope of the invention be measured only by the scope of the appended claims.

I claim:

1. A method to measure the height of a loop in a loop pile fabric comprising: laying a loop pile fabric on a substantially flat surface, coating a surface with a powder and moving the surface in a direction opposite to the lay of the loop in the pile fabric to raise the loop of the pile and allow the loop to brush off some of the powder to form a line thereon and moving a member into alignment with the formed line to automatically cause a gauge operably associated with said member to indicate the height of the loop in the fabric.

2. The method of claim 1 wherein the member is a sliding block and the movement thereof into alignment is against the bias of spring means biasing the sliding block in the upward direction towards the gauge mounted above the sliding member.

3. Apparatus to measure the height of a loop in a loop pile fabric comprising: a housing, a gauge located on top of said housing with an actuator projecting through the top of said housing, a block member slidably mounted in said housing having one end operably associated with said actuator and another end having at least one downwardly projecting finger, said housing adjacent said block member having a sharp edge adapted to engage the loops of a pile fabric placed thereunder, said sharp edge having an upwardly projecting surface having powder thereon which is partially rubbed off by the engagement of the loops thereagainst and means associated with said housing and said block member to move the finger of said block member to a position against the uppermost position of the rubbed-off powder area of the upwardly projecting surface of said sharp edge indicating the top of a measured loop whereby said actuator will cause said gauge to indicate the loop height.

4. Apparatus to measure the height of a loop in a loop pile fabric comprising: a housing, a gauge located on top of said housing with an actuator projecting through the top of said housing, a block member slidably mounted in said housing having one end operably associated with said actuator and another end having at least one downwardly projecting finger, said housing adjacent said block member having a sharp edge adapted to engage the loops of a pile fabric placed thereunder and means associated with said housing and said block member to move the finger of said block member to a position against said sharp edge indicating the top of a measured loop whereby said actuator will cause said gauge to indicate the loop height, said means associated with said housing including a cone member engaging a truncated opening in said block member.

5. The apparatus of claim 4 wherein a magnifying lens is mounted in said housing substantially in line with said sharp edge.

6. The apparatus of claim 5 wherein a light is located in said housing and actuated by a switch on the outside of said housing.

7. Apparatus to measure the height of a loop in a loop pile fabric comprising: a housing, a gauge located on top of said housing with an actuator projecting through the top of said housing, a block member slidably mounted in said housing having one end operably associated with said actuator and another end having at least one downwardly projecting finger, said housing adjacent said block member having a sharp edge adapted to engage the loops of a pile fabric placed thereunder and means associated with said housing and said block member to move the finger of said block member to a position against said sharp edge indicating the top of a measured loop whereby said actuator will cause said gauge to indicate the loop height, said block member being spring biased towards said actuator.

8. The apparatus of claim 7 wherein said actuator is a plunger.

9. The apparatus of claim 8 wherein said means associated with said housing is a cone member engaging a truncated opening in said block member.

* * * * *